United States Patent [19]
Kakazu et al.

[11] Patent Number: 5,333,238
[45] Date of Patent: Jul. 26, 1994

[54] METHOD AND APPARATUS FOR CHECKING INPUT-OUTPUT CHARACTERISTIC OF NEURAL NETWORK

[75] Inventors: Yukinori Kakazu, 52-1, Bunkyodai, Ebetsu-shi, Hokkaido, Japan; Takao Yoneda, Nagoya; Tomonari Kato, Kariya; Kazuya Hattori, Nagoya, all of Japan

[73] Assignees: Toyoda Koki Kabushiki Kaisha, Kariya; Yukinori Kakazu, Ebetsu, both of Japan

[21] Appl. No.: 936,635

[22] Filed: Aug. 28, 1992

[30] Foreign Application Priority Data

Aug. 29, 1991 [JP] Japan .................. 3-244775

[51] Int. Cl.$^5$ ........................... G06F 15/18
[52] U.S. Cl. .......................... 395/21; 395/23
[58] Field of Search ............ 395/21, 23, 22, 24, 395/128; 364/550, 553

[56] References Cited

U.S. PATENT DOCUMENTS

| | | | |
|---|---|---|---|
| 4,876,731 | 10/1989 | Loris et al. | 395/21 |
| 4,914,708 | 4/1990 | Carpenter et al. | 395/23 |
| 4,918,618 | 4/1990 | Tomlinson, Jr. | 395/23 |
| 4,937,872 | 6/1990 | Hopfield et al. | 395/23 |
| 5,119,468 | 6/1992 | Owens | 395/22 |
| 5,121,467 | 6/1992 | Skeirik | 395/11 |

FOREIGN PATENT DOCUMENTS

2-95543 4/1990 Japan .

OTHER PUBLICATIONS

Integrated Digital Control and Filtering for an Electro-dynamically Compensated Weighting Cell, Rudolf Maier IEEE/1989 Oct. 1989.

Neural Networks for System Identification, S. Reynold Chu, IEEE/1990 Apr. 1990.

IEEE Transactions on Systems, Man, and Cybernetics, vol. 19, No. 2, Mar./Apr. 1989, pp. 299-314, S. S. Rangwala, et al., "Learning and Optimization of Machining Operations Using Computing Abilities of Neural Networks".

*Primary Examiner*—Allen R. MacDonald
*Assistant Examiner*—Richemond Dorvil
*Attorney, Agent, or Firm*—Oblon, Spivak, McClelland, Maier & Neustadt

[57] ABSTRACT

An apparatus for checking the input-output characteristic of a neural network which has an input layer, an intermediate layer and an output layer. Plural nodes of the input layer are related to plural nodes of the intermediate layer with plural connection weights while the plural nodes of the intermediate layer are also related to plural nodes of the output layer with plural connection weights. One of the nodes of the input layer is selected as a variable input element while the rest of the nodes are regarded as fixed input elements. A variable data input to the variable input element is varied within a predetermined variation range, while data input to the fixed input elements are fixed, so as to detect how the components of output data from the output layer change. The detected changes of the components of the output data are displayed as the input-output characteristic of the neural network.

14 Claims, 10 Drawing Sheets

| No. | INPUT DATA | TEACHING DATA |
|---|---|---|
| 1 | $D_1$ | $E_1$ |
| 2 | $D_2$ | $E_2$ |
| 3 | $D_3$ | $E_3$ |
| ⋮ | ⋮ | ⋮ |
| n | $D_n$ | $E_n$ |

METHOD AND APPARATUS FOR CHECKING INPUT-OUTPUT CHARACTERISTIC OF NEURAL NETWORK

BACKGROUND OF THE INVENTION

1. Field of the Invention

The present invention relates to a method and an apparatus for checking the input-output characteristic of a neural network.

2. Discussion of the Prior Art

A neural network has been known as a network which memorizes a sequence of cause and effect. Such neural network is composed of an input layer, an intermediate layer and an output layer, and each of layers having plural nodes. Each node of the input layer is related to the respective nodes of the intermediate layer with respective connection weights or connection strengths, while each node of the intermediate layer is related to the respective nodes of the output layer with respective connection weights. These connection weights are corrected through learning operation to optimize the neural network.

The above-mentioned neural network is recently used in machine tools for calculating optimum machining data based upon input and fixed condition data so as to properly carry out required machining operations.

During learning operation, dispersed plural input data are given to the neural network so as to correct or modify the connection weights so that reasonable output data are always obtained.

Namely, one pair of input data and teaching data are firstly used to correct the connection weights so that the output data from the neural network approaches the teaching data, which represent optimum values corresponding to the input data. This learning operation is repeated using a different pair of input and teaching data, and the teaching operation is stopped when all the pairs of input and teaching data are used for the learning operation. By repeating the learning operation, the connection weights are corrected and finally approach specific values so that output data equal to the teaching data are output when corresponding input data are given to the neural network. After the learning operation, the neural network exhibits a desirable input-output characteristic.

However, even after the above-mentioned learning operation, the neural network sometimes outputs inappropriate or abnormal output data in course of actual use in which the neural network is applied to many input data.

In such case, a cause of the abnormality is analyzed using specific input data which induce the abnormal output.

However, it is very difficult to analyze the cause of the abnormality by analyzing the input data, because the neural network is a black box for an operator. Further, even if the operator checks the connection weights of the neural network, it is extremely difficult for the operator to grasp how the connection weights affect the output data from the neural network.

Accordingly, in the conventional neural network system, the various input data are given to the neural network to obtain various output data, and allowable variation ranges of the input data are determined which can be input to the neural network, or which do not induce abnormal output data. However, it is extremely difficult to grasp the characteristics of the neural network through the above-mentioned work, because the neural network is a network in which the components of the input data given to the plural input nodes of the neural network mutually affect each other in course of calculation of the output data.

SUMMARY OF THE INVENTION

Accordingly, it is an object of the present invention to provide improved method and apparatus for easily checking or inspecting the input-output characteristic of a neural network.

Another object of the present invention is to provide an improved method and apparatus for determining allowable variation ranges of input data which can be input to a neural network, by checking the input-output characteristic of the neural network.

Briefly, a neural network according to the present invention has at least an input layer comprising plural input nodes and an output layer comprising at least one output node.

During checking operation, one of input nodes is designated, and variable data is applied to the designated input node while constant data are applied to the rest of the input nodes. Output data from the node of the output layer are then obtained.

The variable data are varied within a predetermined range, and a change of the output data is displayed for allowing an operator to grasp the input-output characteristic of the neural network.

As described above, one of the nodes of the input layer is designated as a variable input element while the rest of the nodes are regarded as fixed input elements, and the input data given to the variable input element is varied within a predetermined variable range while the input data given to the fixed input elements are fixed. Under such condition, the change of output data from the neural network is visually displayed.

Accordingly, it is easy to check the change of the output data when a selected component of the input data varies, whereby the input-output characteristic of the neural network for the selected component is easily grasped. Further, by selectively varying different components of the input data given to different nodes of the input layer, it is possible to check the change of the output data when all the components of the input data are individually varied, whereby the overall input-output characteristics of the neural network is easily grasped. Accordingly, allowable variation ranges of the input data which can be input to the neural network can be easily determined.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIGS. 5 (a) and 5 (b) are flowcharts showing a processing of the CPU during a learning operation;

FIGS. 6 (a) and 6 (b) are flowcharts showing a processing of the CPU for checking the input-output characteristic of the neural network;

DETAILED DESCRIPTION OF THE PREFERRED EMBODIMENT

Referring now to the drawings, a preferred embodiment of the present invention will be described.

1. Structure of System

Figure 1:
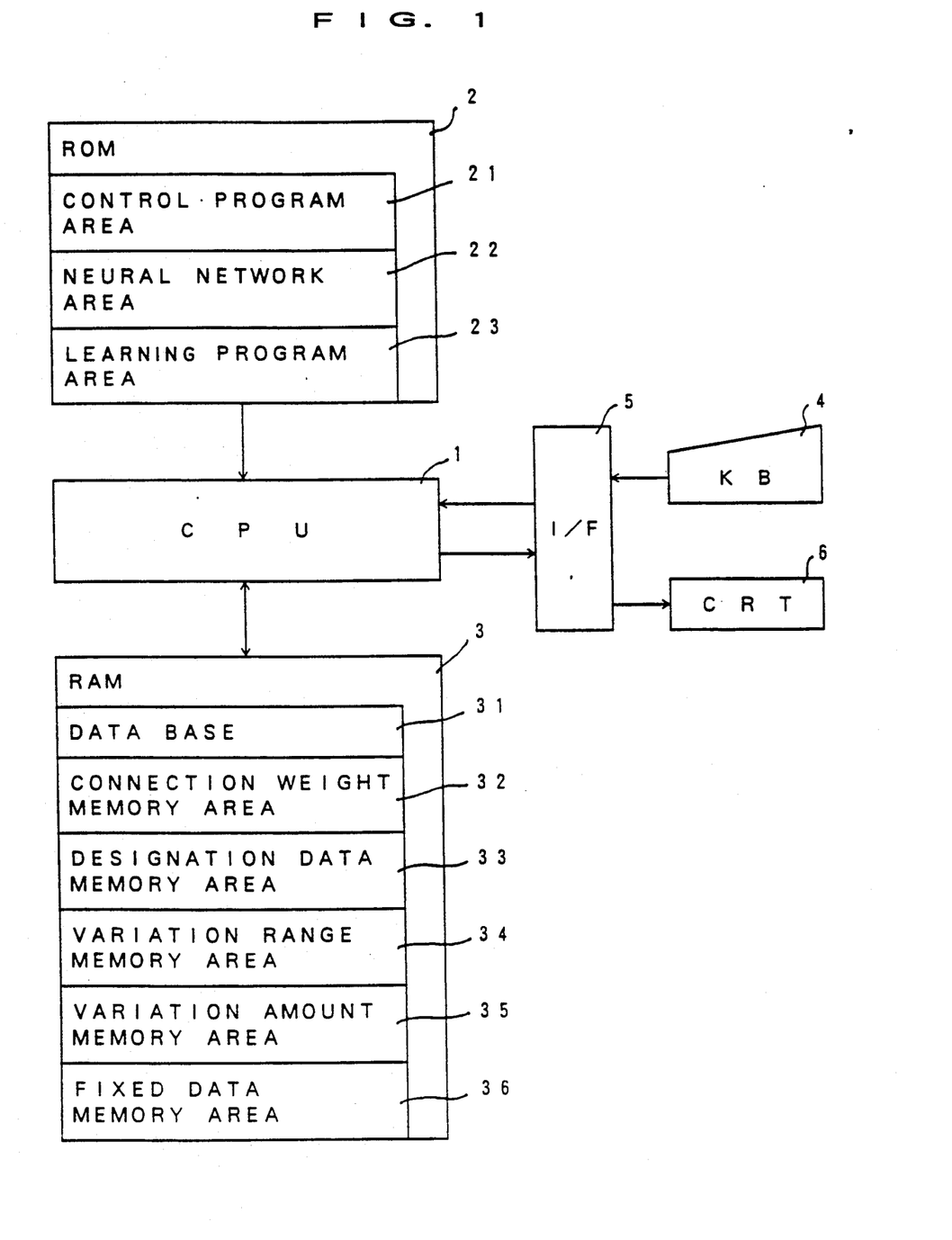
FIG. 1 is a block diagram showing a computer system having a neural network according to the present invention.

A system is designed for automatically generating optimum machining condition data, and is composed of a central processing unit (CPU) 1, a read only memory (ROM) 2, a random access memory (RAM) 3, an interface 5, a keyboard 4 and a display device 6 having a cathode ray tube (CRT), as shown in FIG. 1. The system is connected with a numerical controller (not shown) through an interface (also not shown) so that machining condition data generated in the system are transferred to the numerical controller. The numerical controller controls a not shown grinding machine in accordance with the the machining condition data.

Figure 3:
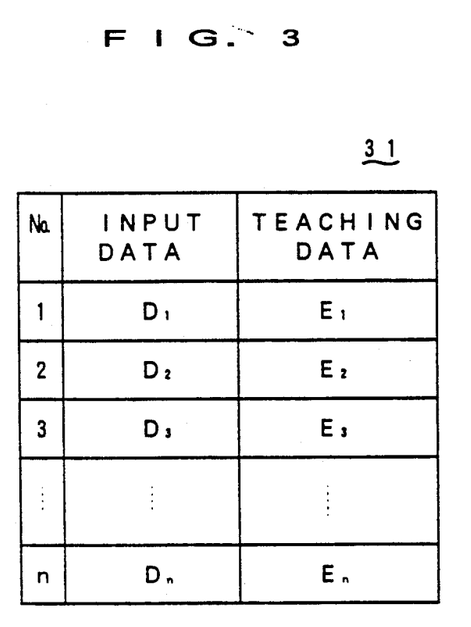
FIG. 3 is a chart showing the contents of a data base formed in the memory shown in FIG. 1.

In the ROM 2, there are formed a control program area 21 in which a control program for general control is memorized, a neural network area 22 in which a program constituting a neural network 10 is memorized, and a learning program area 23 in which a program for learning operation of the neural network 10 is memorized. In the RAM 3, there are formed a data base 31 for memorizing plural sets of input data $D_1$-$D_n$ and teaching data $E_1$-$E_n$, as shown in FIG. 3. Also formed in the RAM 3 are a memory area 32 for memorizing connection weights of the neural network 10, a memory area 33 for memorizing data designating a variable input element and an output node to be monitored, a memory area 34 for memorizing a variation range, a memory area 35 for memorizing a variation amount, and a memory area 36 for memorizing fixed data.

2. Neural Network

Figure 2:
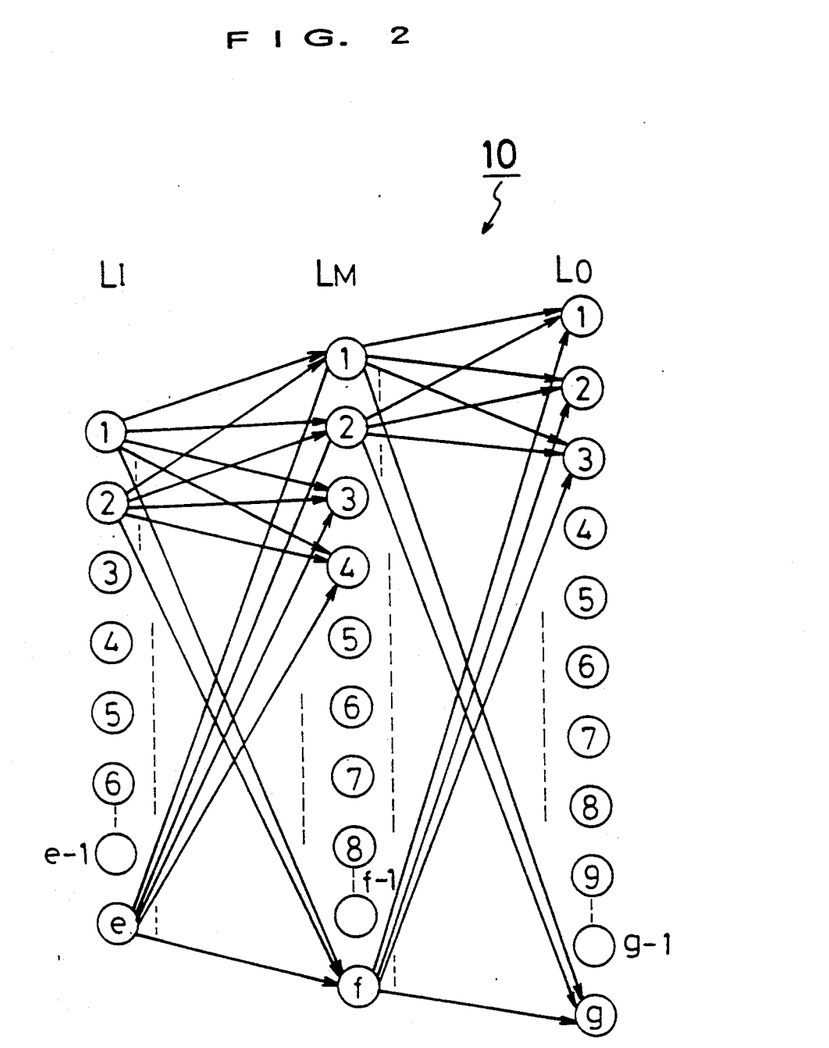
FIG. 2 is a chart showing the structural model of the neural network.

The neural network 10 in this embodiment is composed of an input layer LI, an output layer LO and an intermediate layer LM, as shown in FIG. 2.

The input layer LI has plural input nodes whose total number is e, the output layer LO has plural output nodes whose total number is g, and the intermediate layer LM has plural output nodes whose total number is f.

The output $O^i_j$ of the j-th node of the i-th layer is calculated by using the following equations, wherein i is an integer larger than 1:

$$O^i_j = f(I^i_j) \quad (1)$$

$$I^i_j = \sum_k W^{i-1}{}_{k,j}^i \cdot O^{i-1}{}_k + V^i_j \quad (2)$$

$$f(x) = 1/\{1 + exp(-x)\} \quad (3)$$

where $V^i_j$ is a bias for the j-th node of the i-th layer, and $W^{i-1}{}_{k,j}^i$ is a connection weight between the k-th node of the (i−1)-th layer and the j-th node of the i-th layer.

Since the first layer directly outputs values which are input thereto without operation of the above expressions, the output value $O^1_j$ of the j-th node of the input layer (the first layer) LI is equal to the value input thereto.

Figure 4:
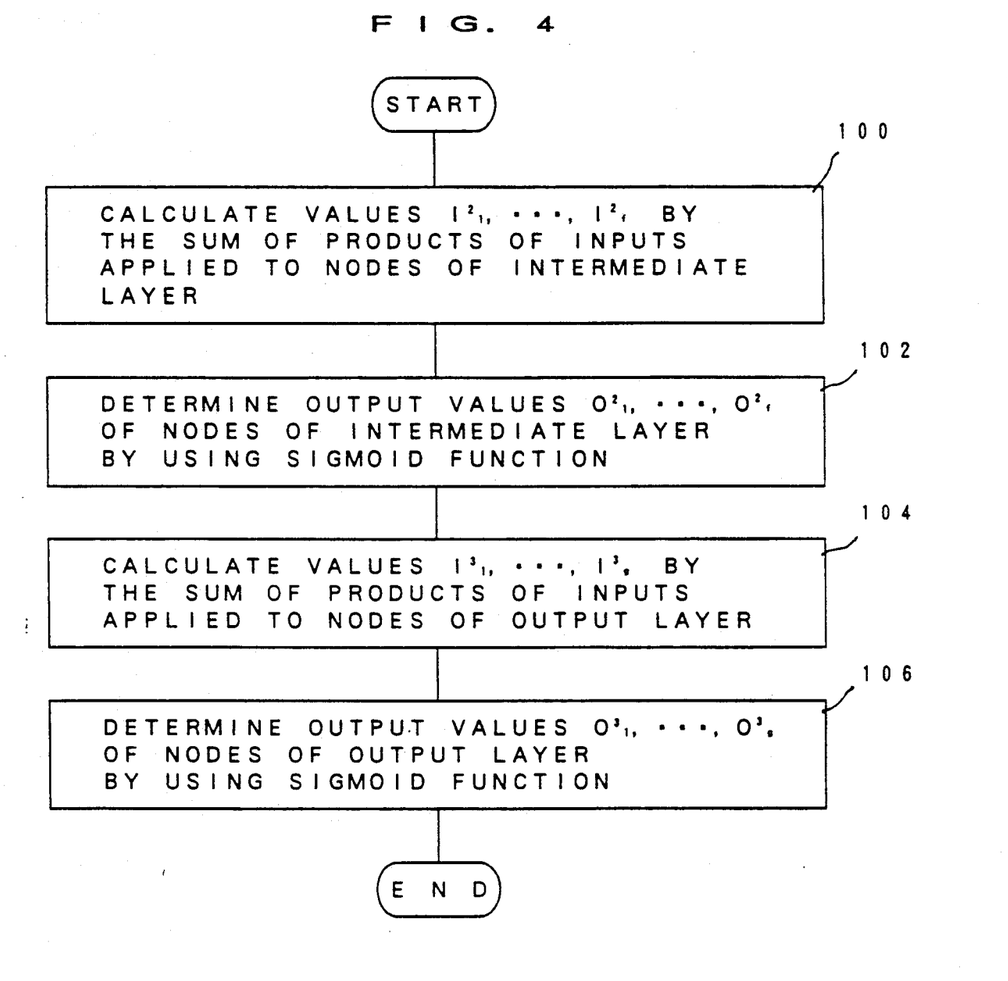
FIG. 4 is a flowchart showing a processing of the CPU shown in FIG. 1 which realizes the operation of the neural network.

Detailed operation of the neural network 10 having three-layer structure will now be explained with reference to the flowchart shown in FIG. 4.

The operation is carried out by executing a program memorized in the neural network area 22 of the ROM 2 with reference to connection weights memorized in the connection weight memory area 32 of the RAM 3.

In step 100, the output values $O^1_j$ of respective nodes of the input layer (the first layer) LI are applied to the nodes of th intermediate layer (the second layer) LM, and then the j-the node of the second layer executes an operation to obtain the sum of products expressed by using the following expression:

$$I^2_j = \sum_{k=1}^{e} W^1{}_{k,j}^2 \cdot O^1{}_k + V^2_j \quad (4)$$

Then, in step 102, the output values of the nodes of the intermediate layer (the second layer) LM are calculated by using the sigmoid function of the values calculated by using the expression (4). The output of the j-th node of the second layer is calculated by using the following expression:

$$O^2_j = f(I^2_j) = 1/\{1 + exp(-I^2_j)\} \quad (5)$$

The output values $O^2_j$ are applied to the nodes of the output layer (the third layer) LO.

Then, in step 104, the sum of products of the inputs applied to each of the nodes of the output layer (the third layer) LO is calculated by using the following expression:

$$I^3_j = \sum_{k=1}^{f} W^2{}_{k,j}^3 \cdot O^2{}_k + V^3_j \quad (6)$$

Then, in step 106, the output values $O^3_j$ of the nodes of the output layer LO are calculated by using a sigmoid function similarly to the expression (5).

$$O^3_j = f(I^3_j) = 1/\{1 + exp(-I^3_j)\} \quad (7)$$

3. Structures of Input Data and Teaching Data

A data base used for learning and renewal learning has a structure as shown in FIG. 3. Plural input data are indicated by reference signs D1 through Dn while corresponding teaching data are indicated by reference signs E1 through En. These n pairs of input data and teaching data are accumulated during an initial learning period of the neural network and during the time when the neural network is actually used.

The input data are defined as follows. Each input data comprises e pieces of data or components which correspond to e pieces of the input nodes (the nodes of the input layer LI). Further, m-th input data is indicated as $D_m$, and a component of the input data corresponding to j-th input node is indicated as $d_{mj}$. In the other word, $D_m$ is a vector, while $d_{mj}$ is a component thereof.

Namely, $D_m$ is expressed as follows:

$$D_m = (d_{m1}, d_{m2}, \ldots, d_{me-1}, d_{me}) \qquad (8)$$

Further, n sets of input data are expressed as $D_1, D_2 \ldots, D_{n-1}, D_n$, respectively. A group comprising n sets of input data is referred to as input data group D in the following explanation.

When the expression (4) is applied to the input data $D_m$, component $d_{mk}$ is substituted for $O^1_k$ of the expression (4).

Similarly, $E_1, \ldots, E_n$ are defined as follows. Each teaching data comprises g pieces of data which correspond to g pieces of the output nodes (the nodes of the output layer LO). Further, m-th teaching data is indicated as $E_m$, and a component of the teaching data corresponding j-th output node is indicated as $e_{mj}$. In the other word, $E_m$ is a vector, while $e_{mj}$ is a components thereof.

Namely, $E_m$ is expressed as follows:

$$E_m = (e_{m1}, e_{m2}, \ldots, e_{mg-1}, e_{mg}) \qquad (9)$$

Further, n sets of teaching data are expressed as $E_1, E_2 \ldots, E_{n-1}, E_n$ respectively. A group comprising n sets of teaching data is referred to as teaching data group E in the following explanation.

4. Learning of Neural Network

Figure 5A:
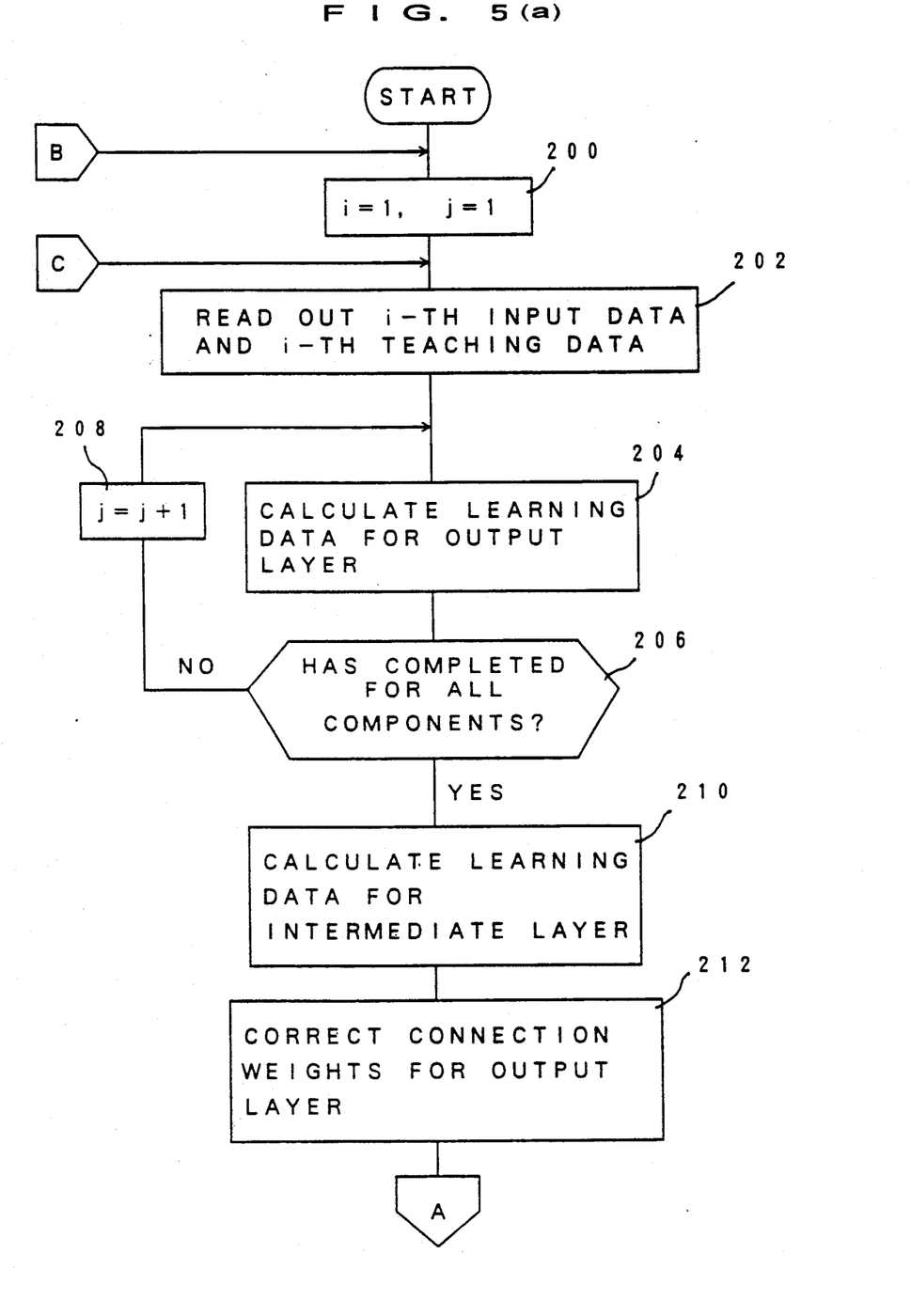
Figure 5B:
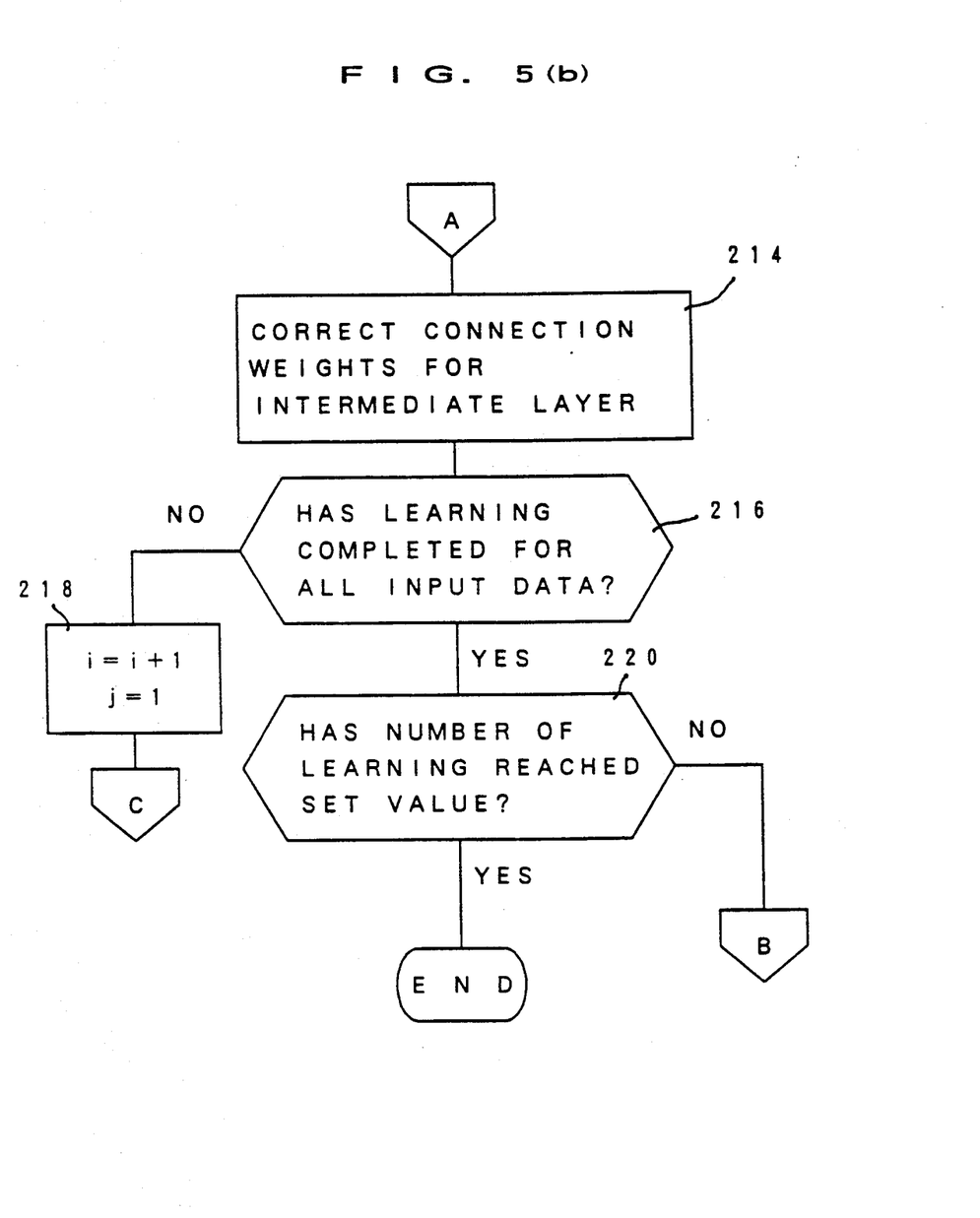

The learning operation of the neural network is carried out, during the initial learning period, by executing the program memorized in the learning program memory area 23 of the ROM 2. The program is shown by the flowcharts of FIGS. 5 (a) and 5 (b). The learning of the connection weights, namely, correction of the connection weights is carried out by a well-known back-propagation method.

This learning operation is repeated until respective output data corresponding to plural sets of input data become equal to corresponding teaching data.

In step 200, a variable i representing a data number is set to an initial value 1, and a variable j representing the node number of an output node (component number of teaching data) is set to an initial value 1.

In next step 202, i-th input data $D_i$ and i-th teaching data $E_i$ are read out from the data base 31.

Then, in step 204, learning data Y for j-th node of the output layer LO is calculated by the following expression:

$$Y^3_j = (e_{ij} - O^3_j) \cdot f'(I^3_j) \qquad (10)$$

where data number i is omitted from $y^3_j$, $O^3_j$, $I^3_j$, and f'(x) is the derivative of a sigmoid function.

Further, the values $I^3_j$ can be obtained as follows. Firstly, the respective components of input data $D_i$ are substituted for $O^1k$ of the expression (4) to obtain the values $I^2_k$ for all of the nodes of the intermediate layer LM, and then the values $I^2_k$ are substituted for the expression (5) so as to obtain output values $O^2_k$. After that, the values $O^2_k$ are substituted for the expression (6) to obtain the values $I^3_j$. The values $O^3_j$ can be obtained by substituting the values $I^3_j$ for the expression (7).

In next step 206, it is judged whether or not the learning operation has been carried out for all of the output nodes or all of the components. When it is judged that the learning operation has not been carried out for all of the output nodes yet, the processing moves back to step 204 through step 208 in which the variable j is incremented by one. With this operation, the above learning operation is repeated for a different output node.

When it is judged at step 206 that the learning operation has already been carried out for all of the output nodes, the processing moves to step 210 in which learning data y for r-th node of the intermediate layer LM is calculated by the following expression:

$$Y^2_r = f'(I^2_r) \cdot \sum_{k=1}^{g} Y^3_r \cdot W^2_{r,3k} \qquad (11)$$

The above calculation for learning data are carried out for all of the nodes of the intermediate layer LM.

In step 212, the connection weight of each node of the output layer LO is corrected or modified with a correction value. The correction value is obtained by the following expression:

$$dW^2_{i,3j}(t) = P \cdot Y^3_j f(I^2_i) + Q \cdot dW^2_{i,3j}(t-1) \qquad (12)$$

where $dW^2_{i,3j}(t)$ represents a variation of the combination weight between the j-th node of the output layer LO and the i-th node of the intermediate layer LM in the t-th calculation, $dW^2_{i,3j}(t-1)$ is a correction value for the connection weight in the (t-1)-th calculation, and P and Q are proportional constants. Therefore, a corrected connection weight is calculated by the following expression:

$$W^2_{i,3j} + dW^2_{i,3j} \to W^2_{i,3j} \qquad (13)$$

After the processing has moved to step 214, the connection weight of each node of the intermediate layer LM is corrected. The correction amount of each connection weight is obtained by the following expression:

$$dW^1_{i,2j}(t) = P \cdot Y^2_j f(I^1_i) + Q \cdot dW^1_{i,2j}(t-1) \qquad (14)$$

Therefore, a corrected connection weight is calculated by the following expression:

$$W^1_{i,2j} + dW^1_{i,2j}(t) \to W^1_{i,2j} \qquad (15)$$

In step 216, it is judged whether or not a series of learning operation using the n sets of input data and teaching data has completed. When the series of the learning operation has not completed yet, the processing moves to step 218 in which the variable i is incremented by one so that next input data and next teaching data are read from the data base 31, and the variable j is set to the initial value 1. After that, the processing moves back to step 202 to repeat the learning operation with the next input data and teaching data.

When it is judged at step 216 that the learning operation using n sets of input data and teaching data has been completed, the processing moves to step 220, in which it is judged whether or not the number of the learning operation reaches a predetermined number (for example, 10,000 times). When it is judged that the number of the learning operation has not reached the predetermined value, the processing moves back to step 200 for carrying out a second learning operation using the n sets of input data and teaching data.

The processing is repeated until it is judged at step 220 that the number of the learning operation has reached the predetermined number.

5. Check of Input-Output Characteristic of Neural Network

Figure 6A:
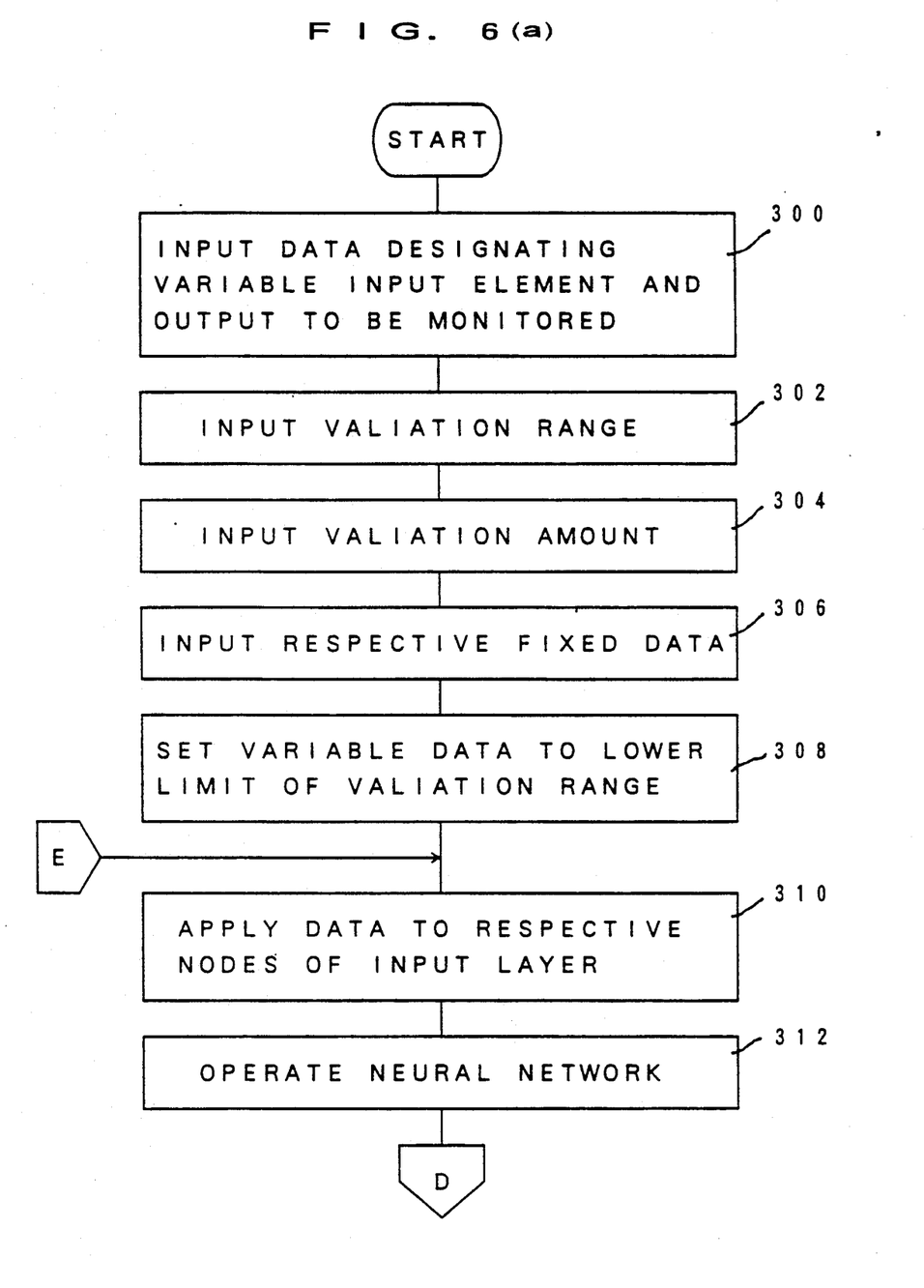
Figure 6B:
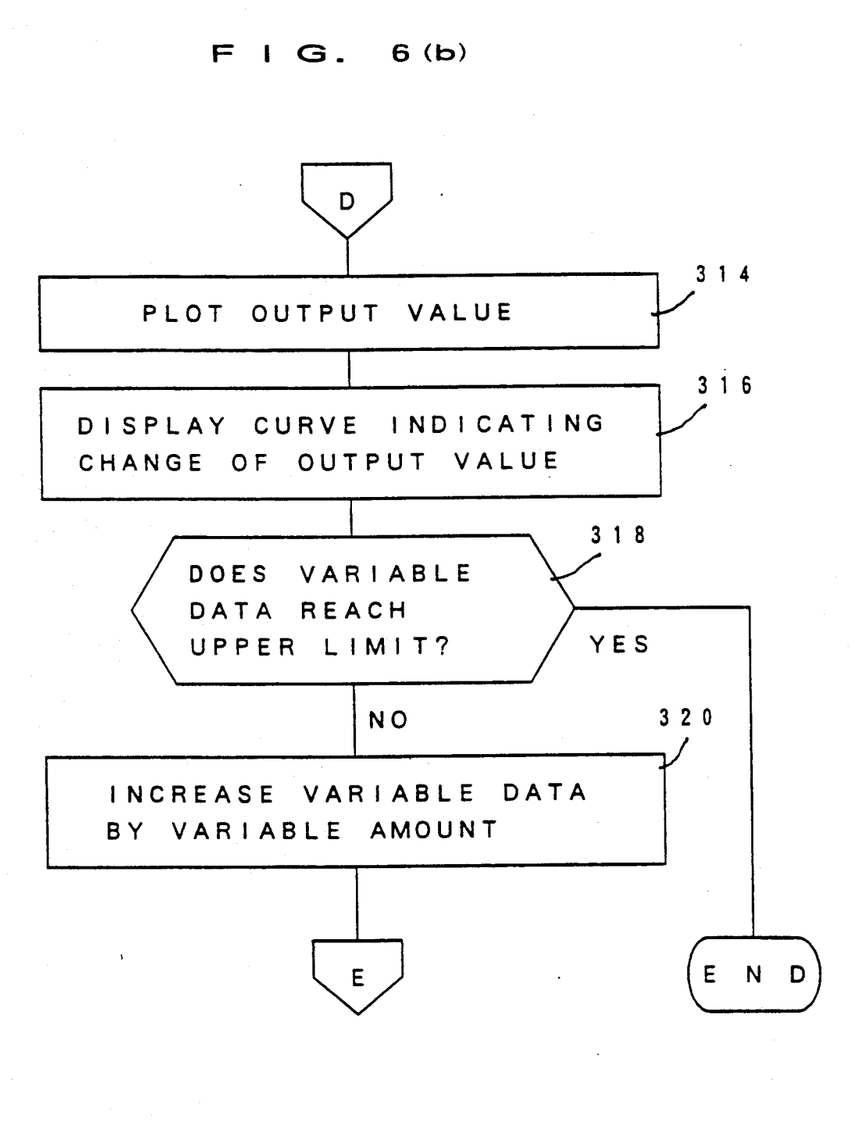

The operation of the CPU 1 for checking the input-output characteristic of the neural network will now be explained with reference to the flowcharts shown in FIGS. 6 (a) and 6 (b).

In step 300, a data is input through keyboard 4 for designating one of the nodes of the input layer LI as a variable input element. In this step, a data is also input for designating one of the nodes of the output layer LO to be monitored. These designation data are stored in the memory area 33 of the RAM 3. The term "variable input element" means a node to which a variable data is applied, while the term "fixed input element" means a node to which constant or fixed data are applied. In this embodiment, the variable input element is a single node of the input layer LI, and the rest of the nodes of the input layer LI are fixed input elements.

In next step 302, a variation range is input through keyboard 4 which indicates a range within which variable data given to the variable input element is varied, and is memorized in the memory area 34 of the RAM 3. In next step 304, a variation amount is also input through the keyboard 4 to be memorized in the memory area 35 of the RAM 3. The variation amount is a value indicating the amount of variation of the variable data at a time. Further, the various fixed data to be applied to the fixed input elements are input through the keyboard 4, at step 306, and are memorized in the memory area 36 of the RAM 3. The fixed data applied to the fixed input elements are standard values of respective components of the input data which are applied to the neural network during the actual usage thereof.

Figure 8:
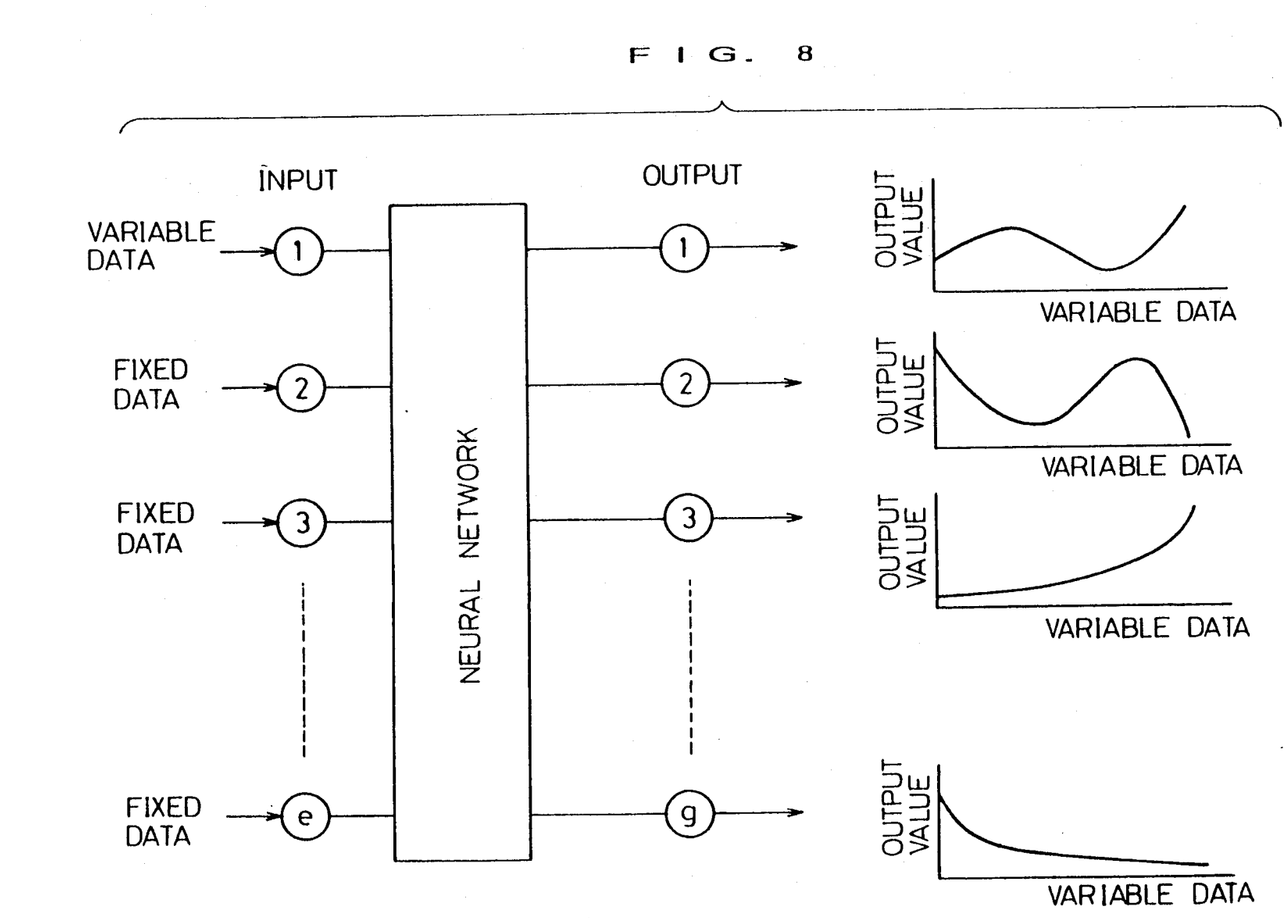
FIG. 8 is an explanation chart showing input data and output data of the neural network and graphs indicating changes of the components of the output data.

In step 308, the variable data to be applied to the variable input element is initially set to the lower limit of the variation range memorized in the memory area 34. In step 310, the variable data obtained at step 308 is applied to the variable input element of the input layer LI, and the fixed data are read out from the memory area 36 and applied to the fixed input elements, as shown in FIG. 8.

After that, the neural network 10 is operated in step 312. Namely, the calculation program memorized in the neural network area 22 of the ROM 2 is executed, as is already explained with reference to the flowchart shown in FIG. 4. After this calculation, respective components of output data are output from the nodes of the output layer LO of the neural network 10. After that, the value of a component designated by the designation data memorized in the memory area 33 is selected.

Figure 7:
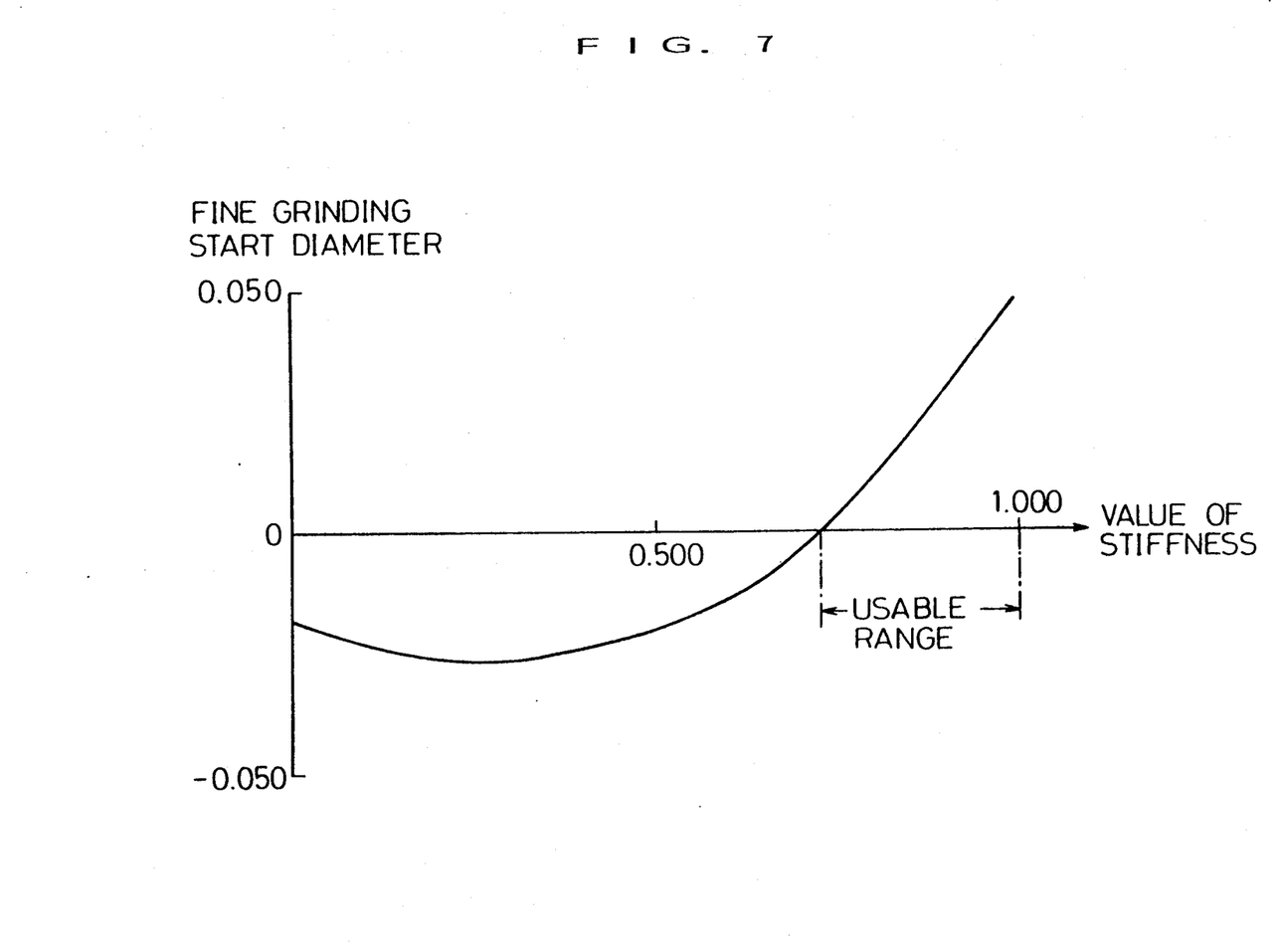
FIG. 7 is an explanation chart showing a change of a specific component of output data from the neural network.

The value of the selected component of the output data is plotted on a coordinate system, as shown in FIG. 7. The horizontal axis of the coordinate system indicates the value of the variable data, and the vertical axis thereof indicates the value of the selected component of the output data. In step 316, all of the previously plotted data and newly plotted data are smoothly connected so that a continuous curve connecting plotted data is displayed on the CRT of the display device 6, as a characteristic curve.

Further, in step 318, it is judged whether or not the variable data reaches the upper limit of the variation range. When it is judged that the variable data has not reached the upper limit, the processing moves to step 310 through step 320 in which the variable data is increased by the variation amount memorized in the memory area 35 of the RAM 3. After that, the processing from step 310 to step 316 is repeated so that the increased variable data and fixed data are applied to the input layer LI of the neural network 10 to obtain new output data. The value of the selected component of the new output data is newly plotted in the coordinate system and the characteristic curve is re-displayed on the CRT.

In the present embodiment, the neural network is used for determining the grinding condition, and fine grinding start diameter is one component of output data while stiffness is one component of input data. FIG. 7 shows a change of the fine grinding start diameter when the stiffness is varied while other components of the input data are fixed. As can been seen in FIG. 7, there is an area in which the fine grinding start diameter becomes negative. Since the fine grinding start diameter never takes negative value, the component of the output data corresponding to the fine grinding start diameter is abnormal when it takes a negative value. Therefore, the variation range of the stiffness must be limited to a range in which the value of the stiffness does not induce a negative fine grinding start diameter. With this, operator can determine an allowable variation range within which the stiffness can be varied. Further, the changes of the other components of the output data are similarly checked to determined respective variation ranges within which the stiffness can be varied. A range at which respective variation ranges overlap each other indicates an usable range in which the stiffness can be varied.

With the above operation, the operator can see and check a part of the input-output characteristic of the neural network 10 for a selected component of the input data, and determine the usable range of the neural network in relation to a selected component of the input data.

After that, a different node of the input layer LI is selected as the variable input element, and a component of the input data applied to the node is varied to detect the changes of the components of the output data. With this operation, an allowable variation range for the different component of the input data is determined. By carrying out the similar procedure for all of the components of the input data, the usable range of the neural network can be determined.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of checking an input-output characteristic of a neural network comprising an input layer composed of plural input nodes and an output layer composed of at least one output node, said method comprising the steps of:
   selecting one of said input nodes;
   applying a variable data to said selected input node and applying constant data to input nodes other than said selected node;
   operating said neural network to obtain output data from said output layer of said neural network;
   varying said variable data within a predetermined range;
   operating said neural network to obtain output data from said output layer of said neural network; and
   displaying a change of said output data.

2. An apparatus for checking an input-output characteristic of a neural network comprising an input layer having plural input nodes and an output layer having one output node, said apparatus comprising:

means for selecting one of said input nodes;

means for applying a variable data to said selected input node and applying constant data to input nodes other than said selected node;

means for operating said neural network to obtain output data from said output layer of said neural network;

means for varying said variable data within a predetermined range; and means for displaying a change of said output data.

3. An apparatus for checking an input-output characteristic of a neural network according to claim 2, wherein said means for varying said data comprises:

means for inputting a variation range within which said data is to be changed;

means for inputting a variation amount;

means for initially setting said variable data to a lower limit of said variation range; and means for repeatedly increasing said variable data by said variation amount until said variable data reaches an upper limit of said variation range.

4. An apparatus for checking an input-output characteristic of a neural network according to claim 3, wherein said apparatus further comprises means for inputting fixed data to said input nodes other than said selected node.

5. An apparatus for checking an input-output characteristic of a neural network according to claim 3, wherein said neural network further comprises an intermediate layer composed of having plural nodes.

6. A method for checking an input-output characteristic of a neural network according to claim 1, further comprising:

setting said variable data to a lower limit of said predetermined range;

operating said neural network using said variable data set to said lower limit;

incrementing said variable data by a variation amount;

operating said neural network using said variable data incremented by said variation amount; and repeating said steps of incrementing and said operating said neural network using variable data incremented by said variation amount until said variable data reaches an upper limit of said predetermined range.

7. A method for checking an input-output characteristic of a neural network according to claim 6, further comprising:

determining a usable range of said variable data based upon said displaying of said output data.

8. A method for checking an input-output characteristic of a neural network according to claim 1, further comprising:

determining a usable range of said variable data based upon said displaying of said output data.

9. A method for checking an input-output characteristic of a neural network according to claim 1, further comprising:

selecting a second node of said input layer;

applying second variable data to said second input node and applying said constant data to input nodes other than said selected node;

operating said neural network to obtain output data using said second variable data;

varying said second variable data within a second predetermined range; and operating said neural network using said varied second variable data.

10. A method for checking an input-output characteristic of a neural network according to claim 1, further comprising:

repeating said selecting, applying, operating and varying steps for all other input nodes of said neural network.

11. A method of checking an input-output characteristic of a neural network comprising an input layer composed of plural input nodes and an output layer composed of at least one output node, said method comprising the steps of:

selecting one of said input nodes of said neural network;

applying variable data to said one input node while applying constant data to input nodes other than said one input node and operating said neural network to obtain first output data from said output node;

varying said variable data within a predetermined range to obtain second variable data;

applying said second variable data to said one input node while applying said constant data to said input nodes other than said one input node and operating said neural network to obtain second output data from said output node; and displaying said first and second output data.

12. A method for checking an input-output characteristic of a neural network according to claim 11, further comprising:

setting aid variable data to a lower limit of said predetermined range;

operating said neural network using said variable data set to said lower limit;

incrementing said variable data by a variation amount;

operating said neural network using said variable data incremented by said variation amount; and repeating said incrementing step and said operating said neural network using variable data incremented by said variation amount step until said variable data reaches an upper limit of said predetermined range.

13. A method for checking an input-output characteristic of a neural network according to claim 12, further comprising:

determining a usable range of said variable data based upon said output data.

14. A method for checking an input-output characteristic of a neural network according to claim 11, further comprising:

determining a usable range of said variable data based upon said displaying of said output data.

* * * * *